Patented Sept. 3, 1935

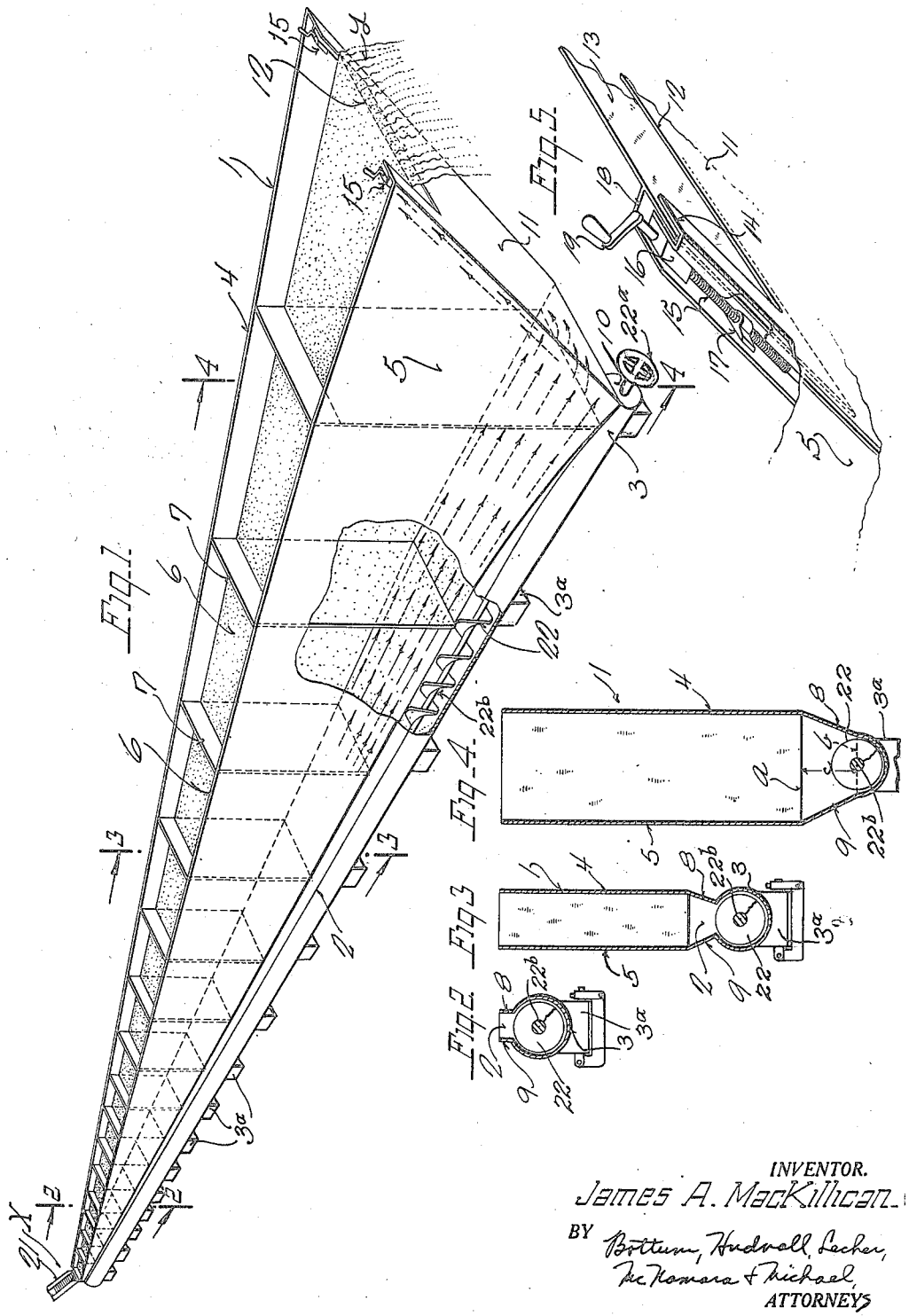

2,013,105

UNITED STATES PATENT OFFICE 2,013,105

SETTLING APPARATUS AND METHOD

James A. Mackillican, Hibbing, Minn., assignor of forty-two and one-half per cent to Ruddore Company, Minneapolis, Minn., a corporation of Minnesota, forty-two and one-half per cent to Longyear Corporation, Marquette, Mich., a corporation of Delaware, and seven and one-half per cent to John O'Brien, Minneapolis, Minn.

Application February 27, 1932, Serial No. 595,459

9 Claims. (Cl. 209—155)

This invention relates to a process of and apparatus for progressively settling disintegrated solid particles of varying sizes from a liquid in which the particles are carried in suspension, the invention being particularly applicable for treating the waste products or pulp resulting from a concentration process whether dealing with metallic or non-metallic material for reclaiming the desired material from such waste products.

The principal object of my invention is to reclaim the desired material by so controlling or regulating the velocity of the flow of the fluid medium carrying the solids in suspension that an opportunity is afforded for the solid particles which obey the law of gravity to respond to said law and settle to the bottom of the path of the flow progressively and according to their size and specific gravity, thereby obtaining a sorting or classification of the reclaimed material along the length of said path.

A further object of my invention is to provide means in the form of a trough to receive the settled material from the flow path so that the accumulated solids may be readily and easily collected for subsequent removal, yet while in the trough not interfering with the velocity of the flow along the flow path.

A further object of my invention is to so design the flow path that its cross-sectional areas vary in such manner along its length that the velocity of the flow is so reduced that eddy currents are eliminated and all solid particles in suspension in the liquid which obey the law of gravity will settle progressively along the length of the path according to their size and specific gravity.

A further object of my invention is to change the direction of flow of the liquid medium at the discharge end of the flow path that the extremely fine particles still in suspension in the liquid will be given a movement of such a character with respect to the general direction of the flow that they will be caused to respond to the law of gravity and settle to the bottom of the path in the receiving trough below the same.

A further object of my invention is to cause the liquid at the discharge end of the path to flow upwardly through gradually increasing cross-sectional areas so as to cause the fine solid particles still in suspension in the liquid to settle when they reach a region or zone where their terminal velocity of fall is greater than the upward velocity of the flow and thus permit a practically clear liquid to be discharged from the path.

A further object of the invention is to establish a constant level reservoir for the flow path along its length and also static heads of such a character that the head at the discharge end will be balanced by the head elsewhere along the path.

A further object of the invention is to so divide the reservoir that chambers of such varying characteristics are provided that the liquid medium filling the same from the flow path will become sufficiently inert to permit the particles in suspension therein to become thoroughly wetted and thus be subject to the law of gravity and settle to the bottom of the path.

A further object of my invention is to regulate or control the velocity of discharge of the fluid from the path so as to aid the action of the process in settling coarse, intermediate and fine particles from the medium carrying the same.

A further object of my invention is to provide an apparatus for carrying out my improved process.

The invention consists further in the matters hereinafter described and claimed.

In the accompanying drawing:

Fig. 1 is a perspective view, partly broken away, of an apparatus constructed in accordance with my invention for practising the process thereof;

Figs. 2, 3 and 4 are transverse sectional views taken through the apparatus to show the change in contour thereof, said figures being taken at lines 2—2, 3—3 and 4—4 respectively, of Fig. 1; and Fig. 5 is a fragmentary perspective view illustrating the adjustable weir or gate construction at the discharge end of the apparatus.

The apparatus of my invention, in the specific form shown in the drawing, comprises an integrated structure of relatively long length, in practice approximately 52 feet, and consisting of a tank 1, a launder 2 and a storage or collecting compartment in the form of a trough 3. These parts are substantially co-extensive in length and are arranged in super-imposed relation with the launder between the tank and the trough and opening upwardly and downwardly respectively into both of them.

The tank has upright side walls 4, 5 which gradually increase in height from one end of the tank to the other, as shown in Fig. 1. These walls have their minimum height at the upper or inlet end X of the tank and their maximum height at the opposite or discharge end Y thereof. These walls also diverge from the inlet end of the tank to gradually increase the width of the same as shown. The tank is divided along its length into a multiplicity of vertically disposed chambers or sections 6, 6 by upright partition walls 7, 7 which join the side walls of the tank and extend from the upper to the lower edges thereof. The spacing between the partition walls is increased along the length of the tank to gradually enlarge the length of the chambers or sections as shown. These sections also vary in width and depth by reason of the divergence and variation in height of the side walls as described.

The launder 2 is defined by side walls 8, 9 which join with the side walls of the tank and extend below the same where they connect with the trough 3. The walls 8, 9 follow the side walls of the tank and thus gradually increase the width of the launder from the inlet to the discharge end of the apparatus. The slope of the launder walls or sides 8, 9 varies gradually from an angle of 90 degrees at the inlet end to 60 degrees at the discharge end. This is illustrated in Figs. 2, 3 and 4, wherein Fig. 2 is a section through the apparatus at a point where the walls 8, 9 are at 90 degrees or vertical. Fig. 3 is a section where the walls are inclined, but not as much as in Fig. 4, which is a section at or adjacent the discharge end of the apparatus. The walls 8, 9 also vary in height along the length of the launder as indicated by these figures, the minimum height being at the inlet end of the device and the maximum height at the discharge end. With the walls so constructed and arranged, the launder has variable bases $a$, $b$, heights $c$ and slopes 8, 9. The purpose of this construction will appear in the following description of the operation of the apparatus in accordance with the process of my invention.

The trough 3 is closed at its ends by suitable end walls, one of which 10 is shown in Fig. 1 at the discharge end of the apparatus. The tank 1 is also closed at its ends, the end wall for the tank at the inlet end of the apparatus being an upward continuation of the end wall for the trough at such end of the apparatus. At the discharge end of the apparatus the closing end wall 11 for the tank is inclined upwardly and outwardly from the bottom of the tank, the purpose of which will presently appear. End wall 11 is cut away at its upper edge to provide a discharge passage 12 for the tank. An adjustable weir or gate 13 is provided for this passage to regulate or control the velocity of the flow of liquid from the tank.

Any suitable form of mechanism may be provided for supporting and adjusting this gate or weir 13. In Fig. 5 I have shown a form of mechanism embodying channels 14, 14 at the opposite sides of the end wall 11 above the discharge opening 12 and into which channels extend the side edges of the weir. Long screws 15, 15 are provided for raising and lowering the weir. These screws are rotatably mounted in supporting blocks 16 secured to the channels 14 on their rear sides. The screws extend through and engage nuts 17 carried by the weir in enclosing flanges 18 on the rear side thereof. The upper ends of the screw are above the top of the tank 1 and are there provided with handles 19 to permit turning the screws for raising and lowering the weir.

In accordance with the process of my invention, the apparatus above described operates as follows: The pulp or fluid containing solids or particles in suspension enters the apparatus at its inlet or upper end X from a conveyor 21, filling all of the chambers or sections 6 of the tank through the flow passage as provided by the launder 2, and rising to a level as determined by the position of the adjustable weir 13 at the discharge end of the tank. A flow of liquid is maintained through the apparatus by constantly introducing liquid containing the solids to be removed into the tank at its inlet end, the liquid freed of its removed solids being discharged from the tank over the weir.

The velocity of the flow through the launder 2 is gradually decreased on account of the integrated increase in the cross-sectional area of the launder, thereby causing a progressive settling of those particles sufficiently coarse to be subject to the law of gravity, in a decreasing order with respect to their size and specific gravity; that is, the heaviest and coarsest settle at the upper end of the launder and the lightest and finest at the lower end so that a classification or sizing is effected along the launder in the collecting trough 3. The design and construction of the launder is based upon the following principles: The launder by reason of its variables as to width, height and slope, is so designed that any particular length or section of it creates that amount of frictional resistance to the flow which will equal or neutralize the kinetic energy expended by the liquid in moving through the particular length. The shape of any cross-section of the launder is trapezoidal, with variable bases $a$, $b$, heights $c$ and slopes 8, 9. These factors are brought about by the particular shape given to the launder and give the minimum wetted perimeter for a given area, and consequently the minimum frictional resistance per unit of length.

The application of these variables in the design of the launder has the effect of practically eliminating all eddy currents in the flow through the launder and causes all those particles in suspension in the liquid, which obey the law of gravity, to settle gradually and progressively to the bottom of the launder. Such an accumulation of solids would interfere with the operation of the launder; therefore, the trough 3 is provided below the launder to receive and collect them. With the side walls of the launder increasing in height from the point of origin to the place of discharge, the trough is deeper at the inlet end and thus can accommodate the larger and coarser particles which settle out of the launder at and adjacent its beginning.

To convey the accumulated solids in the trough 3 to some convenient point for discharge, a conveyor, such as a screw 22, may be installed in the trough and be driven in any preferred manner as by a power applying member 22a at one end of the shaft 22b of the screw where the shaft extends through the end wall 10 of the trough as shown in Fig. 1. A conveyor of the screw type is used in order to minimize eddy currents. The screw may be arranged to serve one or more sections or the entire length of the launder, and the trough 3 may be provided with as many valve or gate controlled discharge openings or spouts 3a as required for the practical use of the apparatus.

While a launder constructed embodying the variables described would cause the major portion of the particles or solids suspended in any fluid to settle, provided they are coarse enough to be susceptible to the law of gravity, the operation of it would be impractical on account of the extraordinary length and width in order to reduce the velocity sufficiently to permit the solids to settle from any substantial flow of pulp such as is usual in any ordinary concentration plant. For these reasons and on account of obtaining a flow of practically clear water over the weir, the launder discharges into the last chamber or section 6 of the tank 1 at its discharge end Y. This chamber or station provides a box, rectangular in horizontal cross-section and is connected with the launder at its lower end in such a way that the flow of the launder is changed from the horizontal to the vertical. One side of the box has a variable slope which depends on the characteristics of the material to be settled at this point in the process. This slope is provided by the inclined end wall 11 of the tank, and it gradually increases the cross-sectional area of the box from the bottom, where connected to the launder, to the top where the adjustable weir 13 is inserted on the slope to control the velocities of the flow. The opposite side of the box, as provided by the partition 7 is vertical and is located immediately above the last trapezoidal-shaped section of the launder. The effect of this arrangement is multiple.

The sudden change in the direction of the flow at the bottom of the box creates a tangential movement of the solid particles in the direction of the launder flow, the force of which will vary in direct proportion to the specific gravity of the particles. These particles so separated will settle on the sloping wall 11 and be directed thereby to the receiving compartment or trough 3. After the direction of the flow is changed from horizontal to vertical, it passes through gradually increasing cross-sectional areas, thereby reducing the velocity of the flow proportionately so that the extremely fine particles remaining in suspension reach a zone in which their terminal velocity of fall will be greater at that point than the upward velocity of the flow. The fluid which entered the launder at its inlet or upper end is discharged over the weir at the top of this box, less the amount contained in the settled solids, practically clear because it then contains only the minute particles which do not obey the law of gravity. However, these particles can be made to settle by the use of a suitable coagulant or flocculant such as lime which may be introduced in the box if the removal of these colloids is desirable.

The tank 1 with its upright side walls is equal and similar in its horizontal section to the top of the launder on which the tank is superimposed. The upright partitions 7 in extending from the top of the tank to the top of the launder and placed at definite intervals along the tank prevent any flow in the tank and confine the flow to the launder only.

The effect of the tank is twofold. It maintains a static head which gradually decreases from the origin or upper end of the apparatus to the vertical side of the box at the lower end of the apparatus. The static head in the box plus that corresponding to the velocity of the overflow at the weir is balanced by the static head in the tank which is a constant-level reservoir. Were it not for the tank, a greater flow of liquid would be required at the upper end of the launder, necessitating a higher velocity in it, and as a consequence, a much larger apparatus. The tank affords an opportunity for the liquid to get a more intimate contact with the very fine particles which are difficult to wet thoroughly and could otherwise be settled only with great difficulty.

The settling launder and the superimposed tank may be constructed in one or more units, that is to say, the settling may not be completed in one unit, but partly settled pulp or fluid may be fed into another unit and from that to another. The arrangement can be made to suit the convenience of the operator.

A fluid carrying particles of non-metallic and/or metallic ores and minerals, tailings, refuse, coal or waste products in suspension is usually referred to as pulp, and the word is so used in this description. A distinction is made also between those particles suspended in any fluid which obey the law of gravity and those which do not. For example, the extremely fine minute particles, such as colloids, do not obey the law of gravity and can be settled only by the use of a flocculant or coagulating agent such as lime.

My process and apparatus may be used for the following purposes. For settling fine, intermediate or coarse particles of any material, susceptible of suspension in a fluid medium, including coal, non-metallic and/or metallic ores and minerals, tailings or the refuse or waste products resulting from the beneficiation or treatment of any such materials. For classifying and/or sizing any of the materials or waste products mentioned. For sorting any such materials which it may be desired to treat and/or beneficiate by any gravity or flotation method of concentration. For sorting out a portion of a particular material which may be desirable for use separately such as in ore material containing considerable alumina in the very fine particles, as for example, clay and paint rock material.

I claim as my invention:

1. An apparatus for settling disintegrated solids from a liquid in which the solids are carried in suspension, comprising an elongated tank having upright side walls increasing in height from the feed to the discharge end of the tank, upright partitions in said tank between said side walls and dividing the tank into a multiplicity of chambers, a launder connected with the side walls of the tank at the bottom thereof and having side walls changing in angularity from end to end of the tank, and a collecting trough of varying depth below the launder.

2. An apparatus for settling disintegrated solids from a liquid in which the solids are carried in suspension, comprising an elongated tank having upright side walls increasing in height from the feed to the discharge end of the tank, partitions in the tank between said side walls and dividing the tank into a multiplicity of chambers, a launder connected with the side walls of the tank at the bottom thereof, and a collecting trough of varying depth beneath the launder and connected therewith, one end wall of the tank being inclined upwardly and outwardly from the launder and having a discharge opening therein.

3. An apparatus for settling disintegrated solids from a liquid in which the solids are carried in suspension, comprising an elongated tank having upright side walls increasing in height from one end of the tank to the other, upright partitions in the tank between said side walls and dividing the tank into a multiplicity of chambers, a launder connected with the side walls of the tank at the bottom thereof, a solid collecting trough beneath the launder and having open communication therewith, one end wall of the tank being inclined upwardly and outwardly from the launder and having a discharge opening therein, and an adjustable weir for said opening.

4. A process for settling disintegrated solids of varying sizes and specific gravities from a liquid in which the solids are carried in suspension, consisting in flowing the liquid along a submerged path and into static regions above and spaced along the length of the path and opening downwardly into the same, controlling the velocity of the flow by so regulating the discharge from the path that a substantially constant head of liquid is maintained for the path in the static regions to offer resistance to the flow and to cause the liquid to become sufficiently static in said regions to settle out the solids which respond to the action of gravity along the bottom of the path according to their size and specific gravity, and collecting the deposited solids along the length of the path.

5. A process for settling disintegrated solids of varying sizes and specific gravities from a liquid in which the solids are carried in suspension, consisting in flowing the liquid along a submerged uninterrupted path and into static regions above and spaced along the length of the path and opening downwardly into the same, the path and the regions gradually and progressively increasing in cross-sectional area throughout the entire length of the path from its inlet to its overflow end, controlling the velocity of the flow at the overflow end of the path so that a substantially constant head of liquid is maintained for the path in the static regions to offer resistance to the flow and cause the liquid in said regions to become sufficiently static to settle out the solids which respond to the action of gravity along the bottom of the path according to their size and specific gravity, and collecting the deposited solids along the length of the path.

6. An apparatus for settling disintegrated solids of varying sizes and specific gravities from a liquid in which the solids are carried in suspension, comprising a launder providing an uninterrupted flow path for the liquid, means providing static chambers for the liquid above and spaced along the launder and opening downwardly into the same, a solid collecting trough in open communication with and extending along the launder beneath the same, an overflow for the launder at the upper edge of the last static chamber, and an adjustable weir for regulating the volume of the overflow.

7. An apparatus for settling disintegrated solids from a liquid in which the solids are carried in suspension, comprising a launder providing an uninterrupted free flow passage for the liquid, means providing static chambers for the liquid above and spaced along the launder and opening downwardly into the same, the launder and the static chambers gradually and progressively increasing in cross-sectional area in the same ratio throughout the length of the launder, a solid collecting trough in open communication with and extending along the launder beneath the same, an overflow for the liquid in the upper edge of the last static chamber, and an adjustable weir for controlling the volume of the overflow.

8. A process for settling disintegrated solids of varying sizes and specific gravities from a liquid in which the solids are carried in suspension, consisting in flowing the liquid along a submerged path and upwardly into separated regions above and spaced along the length of the path from its inlet end to its discharge end, controlling the velocity of the flow by regulating the discharge of the liquid from the region at the discharge end of the path to maintain a substantially constant head of liquid for the path in said regions to offer resistance to the flow and to cause the liquid to become substantially static in the said regions to settle out the solids which respond to the action of gravity at said regions, and changing the direction and rate or flow in the region at the discharge end of the path that the extremely fine particles remaining in suspension in the liquid will be given a movement of a character to cause them to respond to the action of gravity and settle to the bottom of the path.

9. A process for settling disintegrated solids of varying sizes and specific gravities from a liquid in which the solids are carried in suspension, consisting in flowing the liquid along a submerged path and upwardly into separated regions above and spaced along the length of the path from its inlet end to its discharge end, controlling the velocity of the flow by regulating discharge of the liquid from the region at the discharge end of the path to maintain a substantially constant head of liquid for the path in said regions to offer resistance to the flow and to cause the liquid to become substantially static in the said regions to settle out the solids which respond to the action of gravity at said regions, and flowing the liquid at the discharge end of the path in an upward direction and gradually increasing the cross-sectional areas of the liquid to reduce the velocity of the flow that the extremely fine particles remaining in suspension in the liquid will respond to the action of gravity on reaching a zone in which their terminal velocity of fall is greater than the upward velocity of flow.

JAMES A. MACKILLICAN.